Jan. 29, 1957  R. P. POWERS  2,779,631
WHEEL STRUCTURE

Filed Sept. 29, 1953  2 Sheets-Sheet 1

INVENTOR.
ROBERT P. POWERS
BY
W. A. Fraser
ATTY-

Jan. 29, 1957  R. P. POWERS  2,779,631
WHEEL STRUCTURE
Filed Sept. 29, 1953  2 Sheets-Sheet 2
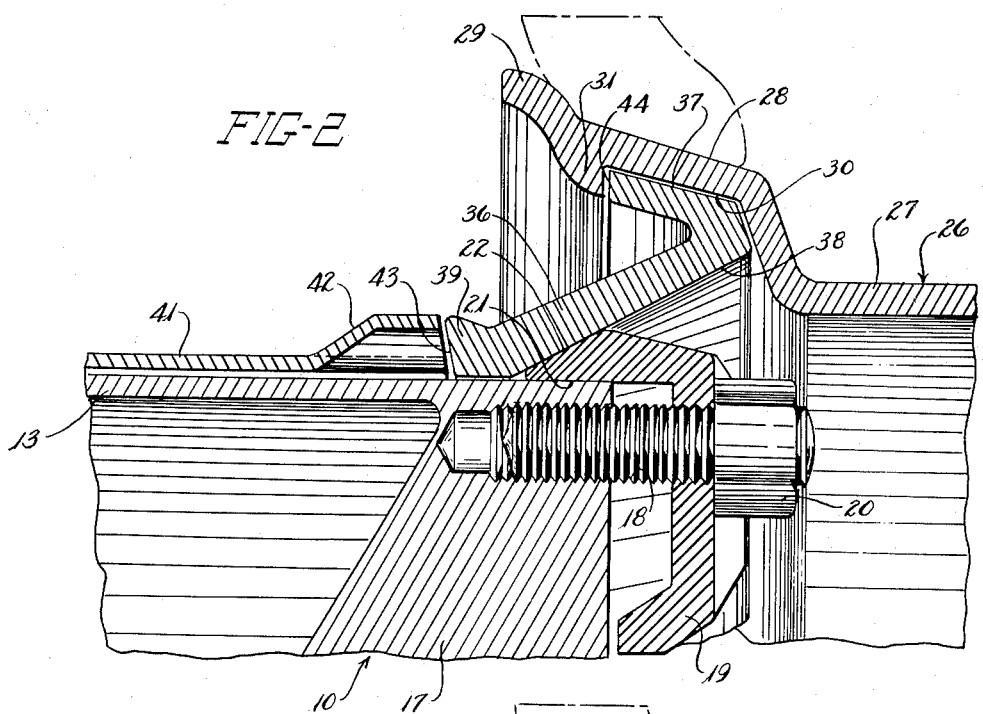
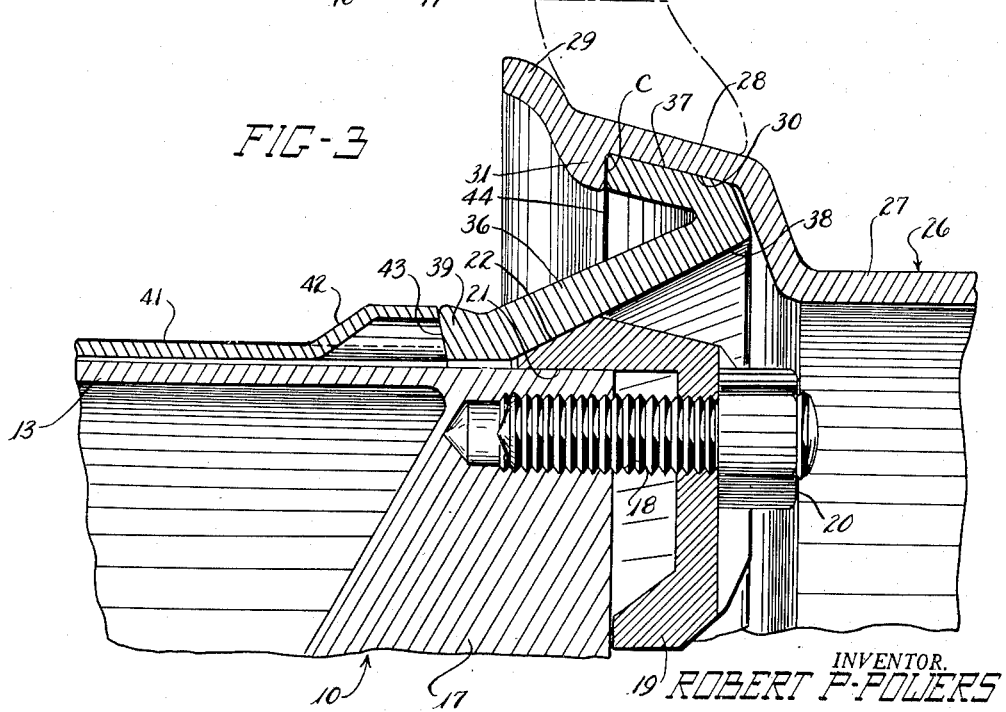
INVENTOR.
ROBERT P. POWERS
BY
W. A. Fraser
ATTY.

United States Patent Office 2,779,631
Patented Jan. 29, 1957

2,779,631

WHEEL STRUCTURE

Robert P. Powers, Akron, Ohio, assignor to The Firestone Tire & Rubber Company, Akron, Ohio, a corporation of Ohio Application September 29, 1953, Serial No. 382,893

1 Claim. (Cl. 301—13)

This invention relates to a dual truck wheel construction and more particularly to a method of assembling a pair of drop-center rims on a so-called Dayton-type wheel.

In the co-pending application of Robert P. Powers Serial No. 337,158, filed February 16, 1953, a novel drop-center rim suitable for use with heavy truck tires is described. One of the features of this rim is the large tapered seats which are adapted to receive the beads of heavy truck tires with the major amount of axial support being provided by reaction with the taper of the bead seats rather than by the restraining side flanges. The present invention takes advantage of these tapered bead seats in assembling such rims on a Dayton-type wheel. In the preferred form of the invention, the rims are secured to the wheel by a split conical ring having tapered surfaces adapted to react respectively with the undersurfaces of the tapered bead seats on the rims and with the tapered surfaces on the plurality of clamps which are provided with wheels of this construction. With this arrangement the parts can be readily assembled to form a rigid, strong, and safe wheel construction. The rims may be readily removed and replaced and no particular skill on the part of the user is required.

It is accordingly an object of the invention to provide an improved dual wheel construction particularly adapted for use with drop-center rims having radially tapered bead seats.

Another object is to provide a wheel construction which may be readily assembled and disassembled providing convenient and easy replacement of the individual rims.

Other objects and advantages will be more fully apparent from the following description of a preferred form of the invention, reference being had to the accompanying drawings in which:

Figure 2 is a fragmentary view on an enlarged scale of a portion of Figure 1 showing the split ring which embodies the invention assembled with the other parts of the wheel prior to tightening the clamping members; and Figure 3 is a view similar to Figure 2 showing the parts rigidly clamped together.

Figure 1:
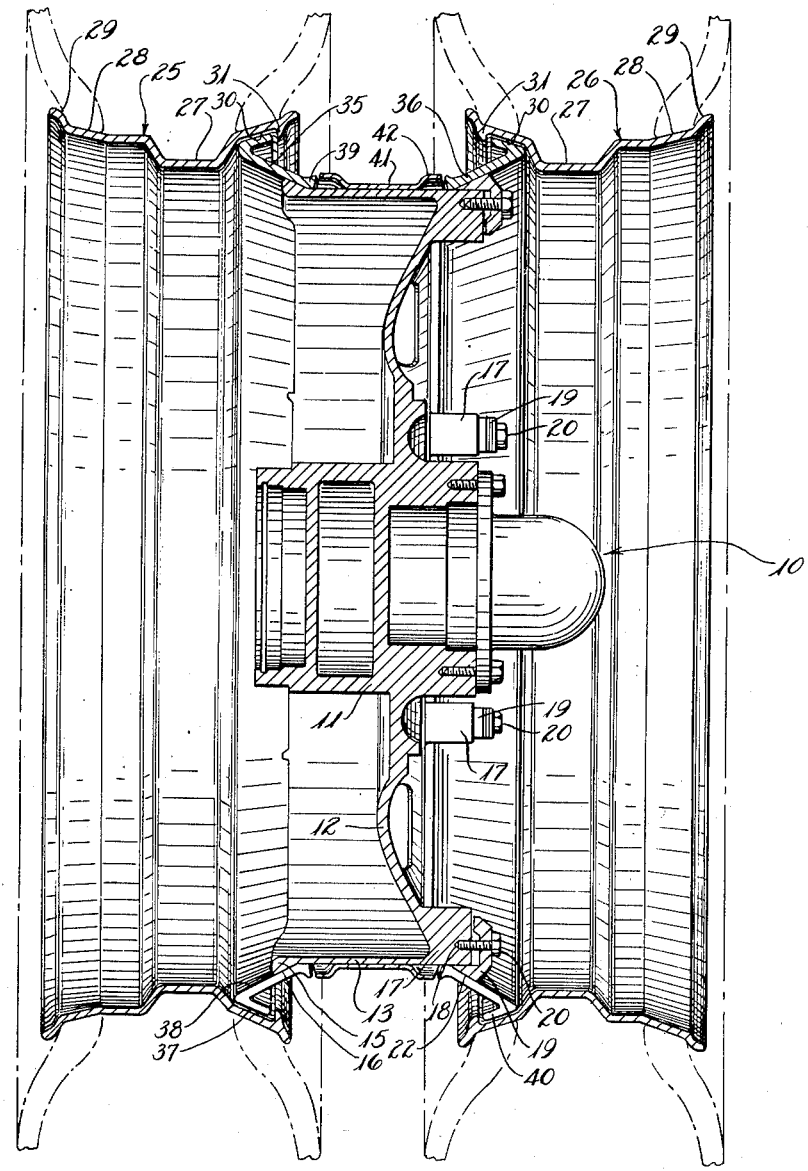
Figure 1 is a transverse sectional view of a pair of rims assembled with a wheel in accordance with the present invention.

The invention is described in connection with a wheel often referred to as a Dayton wheel, indicated generally at 10, and comprising a hub 11 from which a disc portion 12 extends outwardly to terminate in a peripheral flange 13. The flange 13 is substantially cylindrical in form but it terminates in a thickened edge 15 having an outwardly flaring concial surface 16. The wheel is also provided with a plurality of bosses 17 adjacent the flange 13 and having threaded holes 18 which enable a plurality of clamp members 19 to be secured to the wheel by the bolts 20. Each of the members 19 has a cylindrical surface 21 adapted to have sliding engagement with the flange 13 and has an outward conical surface 22 having a function to be described later. The wheel 10, as it has been so far described, is conventional.

The wheel 10 is adapted to be completed by two identical rims indicated at 25 and 26. These rims are described in detail in the co-pending application referred to above. It is sufficient to note in describing the present invention that the rims 25 and 26 are drop-center rims having a drop-center well 27, bead seats 28 which extend at an angle of about 15° to the axis of the rim, and the relatively small side flanges 29. Such rims are preferably formed from hot rolled steel sections of substantially uniform thickness and the result is that the rims have interior surfaces 30 parallel to the tapered surfaces of the bead seats 28 and hence the surfaces 30 also extend outwardly at an angle of about 15°. The present invention takes advantage of the presence of these surfaces 30 in connecting the rims 25 and 26 to the wheel. It should be noted that the rims have inwardly extending projections 31 which may either take the form of a continuous inwardly directed flange or a plurality of circumferentially spaced projections welded to the rim.

The rims 25 and 26 are connected to the wheel 10 by means of the connecting rings indicated generally at 35 and 36. Like the rims, the connecting rings 35 and 36 are identical and may be interchanged merely by turning them around. It will be noted that the rings are annular in section having outwardly tapered surfaces 37 and inwardly tapered surfaces 38, the latter terminating in the short cylindrical portions 39. The rings are split as indicated at 40 so that their diameters may be compressed to permit assembly of the rings with the rims and expanded to lock the parts together into assembled position. The ring 35 holds the rim 25 to the wheel by the reaction of its surface 37 with the rim surface 30, and by the reaction of its surface 38 with surface 16, respectively, and that likewise, ring 36 holds the rim 26 to the wheel in a similar manner, the only difference being that the inner surface 38 of ring 36 reacts with the conical surfaces 22 of the clamp members 19.

To assemble the parts, connecting rings 35 and 36 are compressed and placed within the rim 25 and 26 respectively inside the projections 31 and then are allowed to expand so that their surfaces 37 come into contact with the rim surfaces 30. Usually the resilience of the metal will cause the rings to expand sufficiently to hold the rims and the rings loosely together. However, if desired, the rings may be riveted or spot welded to rims preferably at a point diametrically opposite the splits 40 so as not to interfere with the ability of the rings to expand. The assembled rim 25 and ring 26 are then placed over the flange 13 of the wheel until the surface 38 comes into contact with surface 16. A spacer band 41 is then placed on the flange 13, this spacer having a conventional construction comprising a generally cylindrical surface whose circumferential edges are scalloped as at 42 to provide abutting surfaces for the ends 43 of the connecting rings. The rim 26 and connecting ring 36, after having been assembled in the manner described, are then placed upon the wheel and the clamps 19 are bolted onto the bosses 17. As the bolts 20 draw the clamp members inwardly upon the wheel, the conical surfaces 22 will engage and force the parts leftwardly as viewed in Figure 1 to take up any slack which may exist in the fit of the parts. As the clamps are further tightened, the forces exerted on the connecting rings 35 and 36 by the surfaces 16 and 22 will cause them to expand circumferentially with the result that the ring surfaces 37 will move outwardly into contact with the rim surfaces 30. The bolts 20 are tightened with sufficient force to wedge the parts firmly together. When full, tight contact is made between the rim and the connecting ring surfaces 37 and 30 respectively, it will be noted from Figure 3 that a slight clearance indicated at c remains between the projections 31 and the edges 44 of rings. This ensures that the rims will be supported firmly by the rings without any chance of relative movement between the rims and the rings when the wheel is in service. It will be noted that the load imposed upon the rims by the tires will be such as to wedge the rims firmly to the connecting rings.

The invention thus provides a simple and effective means of assembling drop-center rims to a dual wheel. Various modifications will, however, no doubt occur to those skilled in the art without departing from the spirit and scope of the invention, the essential features of which are summarized in the claim below.

I claim:

A wheel structure comprising in combination, a wheel having an integral outer cylindrical portion terminating in an outwardly flared circumferential surface at one edge and having a plurality of bosses and a corresponding number of clamp members supported by said bosses at the other edge, said clamp members being secured to said bosses by bolts extending into said bosses whereby the clamps are drawn axially toward said wheel when said bolts are tightened, said clamps having outwardly flaring wedge surfaces, a pair of drop center rims with bead seat portions having radially inward surfaces extending axially outwardly at an angle of about 15° to the axis of the wheel, said rim surfaces terminating in an inwardly projecting flange portion, a pair of V-shaped, axially open connecting rings having angularly outwardly extending surfaces contacting said radially angularly inward rim surfaces and having inwardly directed surfaces contacting said flared surface and said clamp wedge surfaces respectively, and a spacer band positioned on said wheel adapted to maintain said rings in spaced relation and adapted to transmit the axial thrust exerted directly on the one ring by said clamp wedge surfaces from said one ring to said other ring, said rings being split radially whereby to expand outwardly against said rims to support said rims securely to said wheel when said clamps are drawn inwardly to exert axial thrust on said rings.

References Cited in the file of this patent

UNITED STATES PATENTS

| | | |
|---|---|---|
| 1,982,057 | Jobski | Nov. 27, 1934 |
| 2,194,206 | MacDonald | Mar. 19, 1940 |
| 2,548,929 | Ash | Apr. 17, 1951 |

FOREIGN PATENTS

| | | |
|---|---|---|
| 284,228 | Italy | Apr. 6, 1931 |
| 297,767 | Great Britain | May 9, 1929 |